United States Patent [19]

Seibert et al.

[11] Patent Number: 5,358,552
[45] Date of Patent: Oct. 25, 1994

[54] IN SITU FILTER CLEANING SYSTEM FOR GAS STREAMS

[75] Inventors: Jeffrey M. Seibert; Nelson Sobel, both of Cortland, Lawrence P. Weber, Holbrook, all of N.Y.

[73] Assignee: Pall Corporation, East Hills, N.Y.

[21] Appl. No.: 922,321

[22] Filed: Jul. 30, 1992

[51] Int. Cl.$^5$ .............................................. B01D 46/04
[52] U.S. Cl. ........................................ 95/281; 55/242; 55/291; 55/302
[58] Field of Search ............... 55/96.242, 291, 243, 55/302, 523; 134/22.18, 30, 37

[56] References Cited

U.S. PATENT DOCUMENTS

| | | | |
|---|---|---|---|
| 3,623,910 | 11/1971 | Calhoun et al. | 134/34 |
| 3,765,152 | 10/1973 | Pausch | 55/379 |
| 3,775,950 | 12/1973 | Hallamore | 55/242 |
| 4,445,912 | 5/1984 | Volk et al. | 55/484 |
| 4,613,369 | 9/1986 | Koehler | 75/246 |
| 4,687,579 | 8/1987 | Bergman | 55/523 |
| 4,692,173 | 9/1987 | Roos | 55/302 X |
| 4,731,100 | 3/1988 | Loeffelmann et al. | 55/302 X |
| 4,824,451 | 4/1989 | Vogt et al. | 55/500 |
| 4,888,114 | 12/1989 | Gaddis et al. | 55/523 |
| 4,895,644 | 1/1990 | Porembski | 55/484 |
| 4,923,068 | 5/1990 | Crowson | 55/96 |

FOREIGN PATENT DOCUMENTS

| | | |
|---|---|---|
| 0290028A1 | 11/1988 | European Pat. Off. |
| 4008742A1 | 9/1991 | Fed. Rep. of Germany |
| 2016667 | 5/1970 | France |
| 193715 | 12/1983 | Japan ............ 55/96 |
| 203912 | 8/1990 | Japan ............ 55/96 |
| 791510 | 3/1958 | United Kingdom |
| 2028163A | 3/1980 | United Kingdom |
| 1575292 | 9/1980 | United Kingdom |
| 2132504A | 7/1984 | United Kingdom |

OTHER PUBLICATIONS

"Making Sense of HEPA Filtration", by W. L. Anderson, *Filtration & Separation*, Nov./Dec. 1989.

"High Efficiency Particulate Arrestors (HEPA Filters) in the Nuclear Industry" by Joseph Goldfield, Sep. 1988.

Brochure No. AS100 of Pallflex, Inc. "Filters for Air Quality Sampling".

Ball Porous Metal Filter Corporation Bulletin GSS-1, May 1987, "The Pall Gas Solid Separation System for the Chemical Process, Refining, and Mineral Indus- (List continued on next page.)

*Primary Examiner*—Robert Spitzer
*Attorney, Agent, or Firm*—Leydig, Voit & Mayer, Ltd.

[57] ABSTRACT

The filtration system comprises a holding vessel and a filter for clarifying contaminated influent gas streams by passing the stream through the filter. The holding vessel has an inlet port for receiving the influent gas to be filtered and for draining the vessel and an outlet port for delivering the clean effluent for further processing. When the particulate matter has clogged the filter and increases the differential pressure across the filter such that it interferes with the normal filtration operation, the particulate matter is cleaned from the filter by isolating the holding vessel from the gas stream and introducing a liquid into the holding vessel and then by backwashing the liquid so that it flows through the holding vessel and the filter in the opposite direction of the influent gas. Backwashing the liquid from the holding vessel dislodges and removes the layer of solid particulate matter on the filter surface and the quantities of particulate matter trapped within the interior of the filter. In a preferred embodiment, the liquid is backwashed by introducing a controlled quantity of pressurized gas into the clean downstream side of the vessel and rapidly opening the drain port resulting in a hydraulic pulse which forces the liquid to flow through the filter in the opposite direction of the influent gas and burst the collected solids from the filter. As the gas head expands, the solids and remaining liquid in the vessel are forced through the inlet port and drain pipe for further processing.

33 Claims, 1 Drawing Sheet

OTHER PUBLICATIONS tries–Advanced Metal Filters for Critical Gas Solid Separation Problems".

Brochure No. NU100, Jul. 1985, Pall Process Filtration Corporation, "Pall Process Filtration Equipment for Nuclear Utilities–High Efficiency Filter Systems for Nuclear Service".

Brochure No. SD 1062, Pall Corporation, "Filtration and Separation for the Nuclear Industry".

Brochure No. PSS 740, Apr. 1985, Pall Porous Metals Filter Corporation, "Porous metal solids separation filtration systems for recovery of precious catalyst or product, environmental and system component protection, and enhanced product quality. Pall Porous Metal Filters for Solids Separation in Liquid and Gas Service".

Brochure No. PGD 100, Pall Corporation–"Pall Nuclear Resource Book".

Brochure No. PSS 740, Apr. 1983, Pall Corporation, "Porous metal solids separation filtration systems for recovery of precious catalyst or product environmental and system component protection, and enhanced product quality. Pall Porous Metal Filters for Solids Separation in Liquid and Gas Service".

Pp. 34–42 of an article of unknown source relating to HEPA filters.

IN SITU FILTER CLEANING SYSTEM FOR GAS STREAMS

FIELD OF THE INVENTION

The present invention relates generally to filtration devices and, more particularly, to a filtration system for cleaning particulate matter from filters used in gas streams.

BACKGROUND OF THE INVENTION

Filtration systems have been used to clarify gas streams in numerous applications. Typical filtration systems employ a modular concept in which a plurality of short filter elements are connected end to end to form a stack of filter elements and then installed into a filter housing. The influent gas streams are pumped into the housing and clarified by allowing them to pass through the filter elements.

Since the release of any airborne radioactive particulate matter in the nuclear industry is impermissible, clarification of off gas streams and ventilation air in nuclear applications is an especially critical filtration application which requires high efficiency gas filters including high efficiency particulate air (HEPA) filters and ultra low penetration air (ULPA) filters. The high efficiency gas filters are designed to have sufficient medium thickness and fine fibers and are sized at an appropriate flow rate per unit of filter area to effectively retain virtually all of the particulate matter in the gas streams. By specification, HEPA rated filters exhibit a particle removal efficiency of 99.97% when challenged by thermally generated monodisperse DOP smoke particles with a diameter of 0.3 micron. Similarly, ULPA rated filters exhibit a particle removal efficiency of 99.999% when challenged by thermally generated monodisperse DOP smoke particles with a diameter of 0.3 micron.

Typical high efficiency gas filters, including, for example, glass fiber filters are mechanically weak and fragile so that they may be structurally damaged when subjected to high air flow, high temperature, high humidity, heavy dust loads or combinations of these factors.

Recently, a novel high efficiency metal filter, called Pall UltraMet Air Filters made by Pall Corporation, has been developed for use in the clarification of gas streams. The metal filter material is a rugged, fibrous sinter bonded medium which is relatively thin and pleated so that high flows can be handled at low pressure differentials in compact assemblies. The high efficiency metal fiber filter has a high surface area, high voids volume medium, exceptional dirt holding capacity, and high mechanical strength.

During the filtration operation, the direct interception of the solids by the filter medium typically results in the formation of a permeable cake of the larger bulk solids on the surface of the filter medium. The dirt capacity of the filter is also consumed when quantities of particulate matter, which are typically smaller than the pore size of the medium and filter cake, are trapped within the interior of the filter medium by the van der Waals forces and electrostatic forces between the medium surface and the particulate matter. The particulate matter effectively clogs the filter elements, increases the pressure drop across the filter, and interferes with the filtration operation. In a typical ventilation stream, for example, the circulating pressure is approximately 20 inches of water pressure so that even the small increases in the differential pressure across the filter medium caused by the small particles will adversely affect the system operation.

The conventional glass fiber filters and sand bed filters have been largely of the disposable type because attempts to clean the filters, including the use of expensive and caustic chemical or acid baths requiring exposure and handling of radioactive waste material, have been largely unsuccessful. Unlike these conventional high efficiency filters, it is impractical and undesirable to dispose of the high efficiency metal filters when they are clogged because they are relatively expensive and the environmental advantage of a regenerable system is lost. Unfortunately, attempts to clean the metal filter using a blowback cleaning method in which a reverse flow of air is forced through the filter element have not been entirely effective because the blowback method is unable to purge the smaller particulate matter trapped within the matrix of the filter.

OBJECTS AND SUMMARY OF THE INVENTION

It is an object of the present invention to provide a filtration system capable of cleaning gas filters.

It is another object of the present invention to provide a filtration system capable of cleaning the high efficiency metal filters.

It is a related object of the present invention to provide a filtration system for removing quantities of particulate matter within the matrix of the filters.

A further object of the present invention is to provide a filtration system capable of cleaning filters in situ without exposing the contaminated material to the operators or the environment.

The present invention provides a filtration system comprising at least one holding vessel containing at least one filter for clarifying gas streams. The holding vessel has an outlet port and an inlet port for receiving the contaminated gas stream so that the gas stream may flow in one direction through the filter and the outlet port. A source of backwash liquid can be introduced into the holding vessel and passed through the filter in the opposite direction of the gas stream to clean the filter.

The present invention also provides a method for cleaning the filtration system. The cleaning method comprises terminating the flow of influent gas into the holding vessel and passing the backwash liquid through the filters in the opposite direction of the influent gas for cleaning the filters.

A preferred embodiment of the filtration system may include a holding vessel and a plurality of filter elements which clarify contaminated influent gas streams by passing the stream through the filter elements. The holding vessel is a cylindrical container having a cylindrical side, a base and a removable cover which can be secured to the vessel side. A plurality of legs which are rigidly attached to the vessel side supports the holding vessel. The holding vessel has an inlet port in the base or side and an outlet port in the cover. The inlet port communicates with an inlet pipe for receiving the influent gas to be filtered. A drain pipe may also be provided in the base for draining the vessel. The outlet port communicates with an outlet pipe for accepting the clean effluent for further processing.

The individual filter elements may include a pleated medium or a hollow, cylindrical mass of fibers mounted on a cylindrical core. The preferred filter element is a high efficiency metal filter. The filter elements may be connected end to end to form a sealed stack of filter elements. Each filter stack is installed into the holding vessel by sealing the filter stack in the base of the holding vessel and sealing the housing cover over the filter stacks.

During the filtration process, the inlet pipe delivers the contaminated gas influent to the inlet port in the base of the holding vessel, thereby filling the holding vessel. The influent gas flows outside-in through the filter element and exits through the outlet port in the cover of the holding vessel. The outlet pipe delivers the clean effluent gas for further processing.

In accordance with one of the objects of the present invention, when the particulate matter clogs the filter elements, thereby increasing the differential pressure across the filter elements such that it interferes with the normal filtration operation, the backwash cleaning cycle is initiated. When the backwash cycle is initiated, the flow of influent gas into the holding vessel is terminated.

The particulate matter is cleaned from the filter elements by introducing a liquid into the holding vessel and then by backwashing the liquid so that it flows through the holding vessel and the filter elements in the opposite direction of the influent gas. The pressure created when the liquid is vigorously and forcibly backwashed from the holding vessel dislodges and removes the layer of solid particulate matter on the filter surface and the quantities of particulate matter trapped within the interior of the filter medium. It will be appreciated that the backwash liquid reduces the effectiveness of the van der Waals forces and the electrostatic attractive forces between the filter surface and the particulate matter so that the solids can be dislodged from the interior of the filter medium more easily. Similarly, the liquid dislodges the cake layer of the larger particulate solids on the surface of filter medium. In order to reduce the van der Waals and electrostatic forces between the filter surface and the solid particles, the liquid must saturate substantially all of the surface area of the filter medium. It will be appreciated that the amount of backwash liquid needed to saturate the filter medium will depend on the particular filtration system including the size of the holding vessel and the number of the filter elements but, typically, the liquid level should be high enough to cover the filter stacks within the holding vessel. Any liquid which is compatible with the components of the filtration system and the filter elements can be used but water is generally preferred. Other suitable liquids would also include liquids which will better wet the medium and particulates or partially solubilize the particulates, or otherwise reduce attachment of the particulates to the filter medium and each other including, for example, water containing surfactants, nitric acid solutions, caustic soda solutions or organics which are solvents for all or some of the particulates. In order to insure that the backwash liquid will not further contaminate the filter elements, the backwash liquid is prefiltered to at least the rating of the filter elements.

Once the filter medium has been saturated with the backwash liquid, the liquid is backwashed with sufficient force so that the particulate matter, particularly the particulate matter trapped in the interior of the filter elements, will be dislodged from the filter elements and removed from the holding vessel. In one embodiment, pressurized liquid can be introduced into the downstream side of the holding vessel to force the liquid to backwash through the holding vessel, as defined by the direction of the gas flow, and the filter elements at a relatively high velocity. In a preferred embodiment, a controlled quantity of pressurized gas is introduced into the downstream side of the vessel and the drain port is rapidly opened resulting in a hydraulic pulse which forces the liquid to pass through the filter elements in the opposite direction of the gas flow and burst the collected solids from the filter. As the gas head expands, the solids and remaining liquid in the vessel are forced through the inlet port or drain pipe for further processing. It will be appreciated that when the gas pressure expands, a peak liquid velocity is created which will steadily decrease and level off. It is desirable to create the highest peak velocity to insure that the solids trapped within the filter medium and those located on the filter surface are dislodged. The peak liquid velocity and the pressure limit will depend on the filtration system and the filter medium. Any gas which is compatible with the components of the filtration system can be used including, for example, nitrogen or air. Instrument dry air is the preferred gas. The gas should be prefiltered to at least the rating of the filter elements to insure that the gas does not contaminate the filter elements. Multiple cycles of backwash with alternate fluids may be desirable to more completely clean the elements.

After the liquid and the gas have been expelled from the holding vessel, the holding vessel is then dried by passing warm dry air in the opposite direction of the normal gas flow. Forward flow is restored to the holding vessel after the holding vessel is dry. The balance of the filter vessels in the filtration system may be backwashed sequentially.

In accordance with one of the objects, the present filtration system permits the filter elements to be cleaned in situ without removing the filter elements from the holding vessel. Thus, the contaminated particulate matter is not exposed to the operators or the environment.

These and other features and advantages of the invention will be more readily apparent upon reading the following description of a preferred exemplified embodiment of the invention and upon reference to the accompanying drawings wherein:

Figure 1:
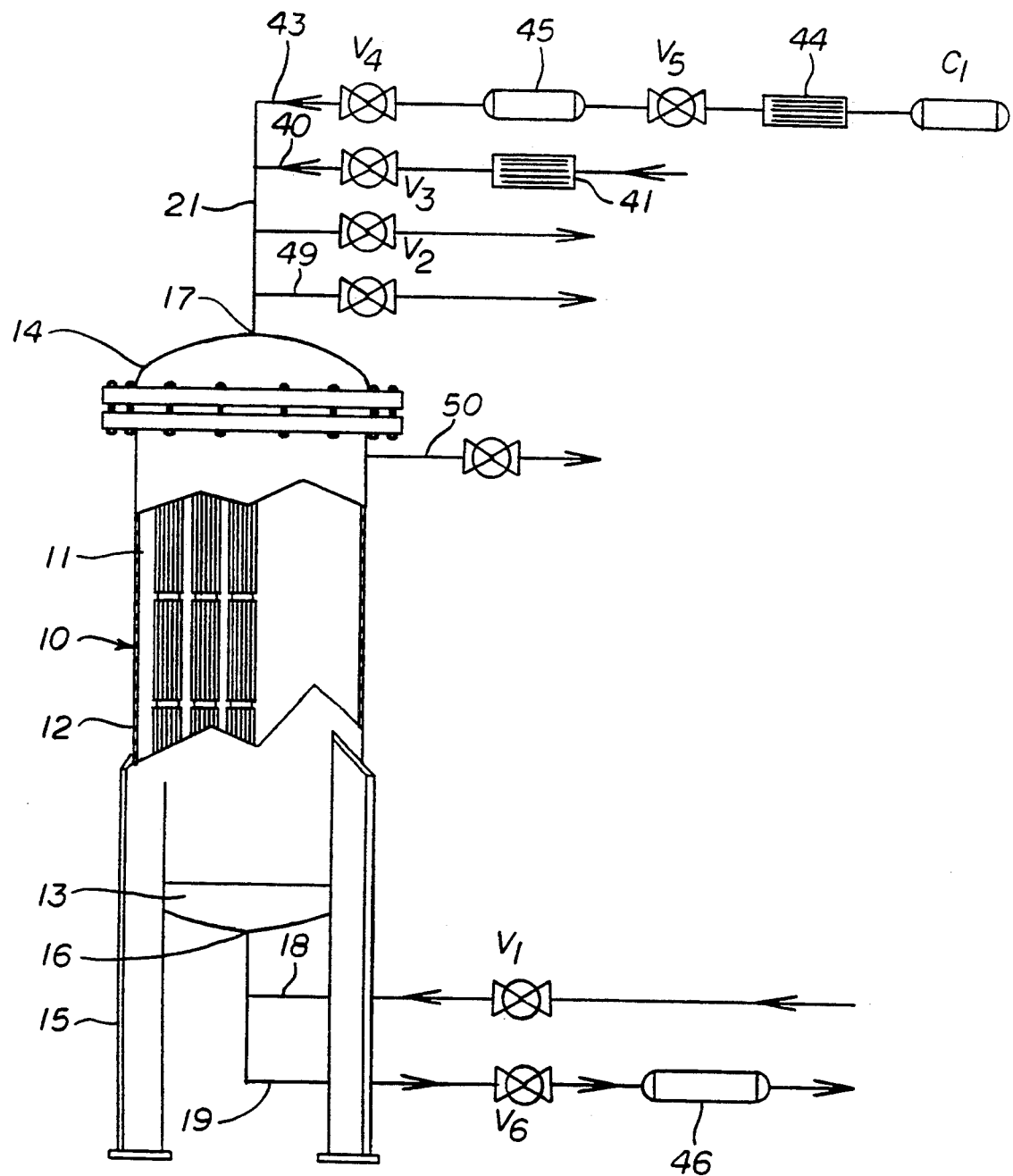
FIG. 1 is a schematic flow diagram of a filtration system comprising a holding vessel and a plurality of filter elements which clarify contaminated influent gas streams by passing the stream through the filter elements in accordance with the present invention.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Turning to the drawings, FIG. 1 illustrates a schematic flow diagram of a preferred embodiment of a filtration system comprising at least one holding vessel 10, each holding vessel 10 containing at least one filter element 11 which clarifies contaminated influent gas streams by passing the stream through the filter element 11. Only one holding vessel 10 is illustrated to simplify the figure but it will be appreciated that the filtration system may comprise a plurality of similar holding vessels 10 which may operate independently of each other. For example, multiple vessel systems are used when process flow rates are high or continuous uninterrupted flow is required.

The illustrated holding vessel 10 is a cylindrical container having a cylindrical side 12, a base 13 and a removable cover 14 which can be secured to the vessel side 12. The holding vessel 10 is supported by a plurality of legs 15 which are rigidly attached to the vessel side 12. The removable cover 14 can be attached to the holding vessel 10 through any conventional means. The typical holding vessel 10 has a gas inlet port 16 in the base 13 and an outlet port 17 in the cover 14. Alternative arrangements of holding vessels may be used. The inlet port 16 communicates with an inlet pipe 18 for receiving the influent gas to be filtered and a drain pipe 19 for draining the vessel 10. The outlet port 17 communicates with an outlet pipe 21 for delivering the clean effluent for further processing.

The individual filter elements 11 may include a pleated medium or a hollow, cylindrical mass of fibers mounted on a cylindrical core. In addition, the filter medium may be a metal medium formed from powdered metal or woven wire. The preferred filter element 11 is a novel high efficiency metal fiber medium, called Pall UltraMet Air Filters available from Pall Corporation, recently developed for use in the clarification of gas streams. The medium, which comprises a sinter bonded metal fiber, may be relatively thin and pleated so that high flows can be handled at low pressure differentials in compact assemblies. The high efficiency metal fiber filter element is very rugged and has a high surface area, high voids volume medium, exceptional dirt holding capacity, and high mechanical strength. The pore size rating for this high efficiency gas filter is about 0.3 micron in gas service, as measured using thermally generated monodisperse DOP smoke particles with a diameter of 0.3 micron.

In the illustrated filtration system, the filter elements 11 may be connected end to end to form a sealed stack of filter elements 11. Each filter stack is installed into the holding vessel 10 by sealing the filter stack between a top tube sheet and a bottom support plate (not shown). To prevent the influent gas from bypassing the filter elements 11 and contaminating the downstream side containing the clean effluent, it will be appreciated that a gas-tight seal is created between the individual filter elements 11 and the filter stack and the tube sheet by any conventional means.

During the filtration process, the inlet pipe 18 delivers the contaminated gas influent to the inlet port 16 in the base 13 of the holding vessel 10, thereby filling the holding vessel 10. The influent gas flows radially outside-in through the filter medium and then axially through the center of the filter elements 11, to exit through the outlet port 17 in the cover 14 of the holding vessel 10. The outlet pipe 21 delivers the clean effluent gas for further processing.

During the filtration operation, it will be appreciated that as the filter elements 11 filter particulate matter from the influent gas stream, the differential pressure across the filter elements 11 increases as the particulate matter is trapped by the filter elements 11. A permeable cake of solids may be formed on the filter surface as the larger particles, typically larger than one micron, are trapped through direct interception. Smaller particles, which are typically smaller than the filter pore rating, are trapped in the interior of the filter medium by the van der Waals forces or the electrostatic attractive forces of the filter surface. The differential pressure across the filter elements 11 may be measured by any conventional means which is well known in the art. Typically, the differential pressure is measured across the inlet port 16 and outlet port 17 of the holding vessel 10.

In accordance with one of the objects of the present invention, when the particulate matter has clogged the filter elements 11 and increased the differential pressure across the filter elements 11 such that it interferes with the normal filtration operation, the backwash cleaning cycle is initiated. The specific pressure differential at which the efficiency of the filtration operation begins to degrade such that the backwash cycle should be initiated will depend on the particular filtration system and will be known to those skilled in the art. In a typical ventilation gas stream for example, the system may have a circulating pressure of approximately 20 inches of water and a differential pressure across the clean filter elements 11 of about 3-4 inches of water. In view of these relatively low operating pressure differentials, it will be appreciated that even the small increases in the differential pressure across the filter elements 11 caused by quantities of particulate matter will adversely affect the system operation. In such a system, the backwash cleaning system would typically be initiated when the differential pressure is on the order of 8-10 inches of water.

When the backwash cycle is initiated, the flow of influent gas into the holding vessel 10 is terminated, for example, by closing inlet valve V1 and outlet valve V2 in the illustrated embodiment. It will also be appreciated that the holding vessel 10 will be isolated from the other vessels 10 in a multiple vessel system.

In accordance with one of the objects of the invention, the particulate matter is cleaned from the filter elements 11 by saturating the filter elements 11 with a liquid and then by backwashing the liquid so that it flows through the holding vessel 10 and the filter elements 11 in the opposite direction of the influent gas, for example radially inside-out through the medium. Backwashing the liquid from the holding vessel 10 dislodges and removes the layer of solid particulate matter on the filter surface and the quantities of particulate matter trapped within the interior of the filter elements 11.

In the illustrated embodiment, water is introduced into the holding tank 10 by opening water valve V3 and permitting the water to flow through water inlet pipe 40. The influent gas in the holding vessel 10 is vented through vent lines 49 or 50. It will be appreciated that the presence of the liquid in the interior of the filter elements 11 reduces the effectiveness of the van der Waals forces and the electrostatic attractive forces between the surface of the filter medium and the particulate matter and between the particulate so that the particulate matter can be dislodged from the filter elements 11 very effectively. Similarly, passing the liquid in the opposite direction of the gas flow dislodges the cake layer of the larger particulate solids on the surface of filter elements 11. In order to reduce the van der Waals forces and the electrostatic forces between the filter surface and the solid particles and between the solid particulate, the liquid must saturate substantially all of the surface area of the filter elements 11. It will be appreciated that the amount of backwash liquid needed to saturate the filter elements 11 will depend on the particular filtration system including the size of the holding vessel 10 and the number of the filter elements 11 but, typically, the liquid level should be high enough to cover the filter elements within the holding vessel 10 and substantially fill the cover 14. Since the volumetric capacity of the holding vessel 10 and cover 14 are typically known, a predetermined quantity of liquid may be delivered to the holding vessel 10 and cover 14 to fill them. Similarly, a conventional water level monitor may control the level of water in the holding vessel 10 and cover 14. Any liquid which is compatible with the components of the filtration system and the filter elements 11 can be used but water is generally preferred. Other suitable liquids include liquids which will better wet the medium and particulate or which will partially solubilize the particulate or otherwise reduce attachment of the particulates to the filter medium and each other including, for example, water containing surfactants, nitric acid solutions, caustic soda solutions or organics which are solvents for all or some of the particulates. In order to insure that the backwash liquid will not further contaminate the filter elements 11, the backwash liquid may be prefiltered to at least the rating of the filter elements 11. In the preferred embodiment, for example, the water is prefiltered through a filter 41 having a pore rating of at least one micron which is the rating of the metal filter elements 11 in liquid service.

Once the filter elements 11 have been saturated with the backwash liquid, the liquid must be backwashed with sufficient force so that the particulate matter, particularly the particulate matter trapped in the interior of the filter elements 11, will be dislodged from the filter elements 11 and removed from the holding vessel 10. In one embodiment, pressurized liquid can be introduced into the downstream side of the holding vessel 10 for forcing the liquid to backwash through the holding vessel 10 and the filter elements 11 at a relatively high velocity. In a preferred embodiment, a controlled quantity of pressurized gas is introduced into the downstream side of the vessel 10 through gas inlet pipe 43 by opening gas valve V4 and rapidly opening valve V6 to create a hydraulic pulse which forces the liquid to reverse flow through the filter elements 11 and burst the collected solids from the filter. As the gas head expands, the solids and remaining liquid in the vessel 10 are forced through the inlet port 16 and drain pipe 19 for further processing. It will be appreciated that when the gas pressure expands, a peak liquid velocity is created which will steadily decrease and level off. It is desirable to create the highest peak velocity to insure that the solids trapped within the filter elements 11 and those located on the filter surface are dislodged. The peak liquid velocity and the pressure limit will depend on the size of the filtration system and the filter medium porosity. Any gas which is compatible with the components of the filtration system can be used including, for example, nitrogen or air. Instrument dry air is the preferred gas. The gas should be prefiltered to at least the rating of the filter elements 11 to insure that the gas does not contaminate the filter elements 11. In the preferred embodiment, for example, the air is prefiltered through a filter 44 having at least a 0.3 micron rating since the metal filter elements 11 have a pore rating of 0.3 micron for gas service.

The holding tank 10 can be pressurized using any conventional technique. In the illustrated embodiment, the pressurized gas is supplied from an auxiliary gas reservoir 45 which is pressurized to a predetermined level by compressor C1 by opening pressure valve V5. The auxiliary gas reservoir 45 enables the holding vessel 10 to be pressurized quickly upon initiation of the backwash cleaning cycle. Pressure valve V5 remains open until the holding vessel 10 is pressurized to the predetermined level, at which point pressure valve V5 is closed; or optionally left open.

It will be appreciated that the water must be backwashed with force sufficient to dislodge the layer of solid particles on the filter surface and the particles trapped within the filter elements 11. In the preferred embodiment, for example, it has been found that a peak liquid velocity in the range of about 2-3 gallons per minute per square foot of filter medium is sufficient to remove the particulate matter from the high efficiency metal filters 11. In order to generate this water velocity, the gas pressure will typically have to be in the range of about 20 to 150 psig; preferably 80 to 100 psig. In the preferred embodiment, the metal filter elements 11 have an exterior support cage, typically a wire spirally wound around the exterior of the filter elements 11 for added support for preventing the force of the liquid from rupturing the filter elements 11.

After the holding vessel 10 is pressurized to the desired level, the filter elements 11 are backwashed by opening drain valve V6 permitting the pressurized gas to expand and force the liquid to flow through the filter elements 11 in the opposite direction of the initial gas flow. In the preferred embodiment, the backwash water containing the particulate matter is delivered to a backwash catch tank 46 for further processing. In the nuclear applications, for example, the water will be treated for radioactive waste disposal. Multiple cycles of backwash with alternate fluids may be desirable to more completely clean the elements.

After the liquid and the gas have been expelled from the holding vessel 10, the holding vessel is then dried by passing warm, dry air in the opposite direction of the initial gas flow. Forward flow of the influent may be restored to this vessel by opening valves V1 and V2. The remaining of the filter vessels in the filtration system may be backwashed sequentially.

It should now be appreciated that, in accordance with one of the objects, the present filtration system permits the filter elements to be cleaned in situ without removing the filter elements from the holding vessel. Thus, the contaminated particulate matter is not exposed to the operators or the environment.

We claim as our invention:
1. A method for cleaning a gas filtration system, the filtration system having a holding vessel containing a gas filter for clarifying an influent gas stream passing through the gas filter in one direction, the cleaning method comprising:
   terminating the flow of influent gas into the holding vessel;
   introducing a backwash liquid into the holding vessel;
   pressurizing the holding vessel with a pressurized gas after the liquid is introduced into the holding vessel; and
   expanding the pressurized gas to pass the backwash liquid through the gas filter in the opposite direction of the influent gas for cleaning the gas filter.

2. The method according to claim 1 wherein the filtration system has more than one holding vessel and wherein the cleaning method further comprises isolating at least one of the holding vessels from the other holding vessels in the filtration system.

3. The method according to claim 1 further comprising filling the holding vessel with backwash liquid, pressurizing the holding vessel with a pressurized gas after the holding vessel is filled with the liquid and expanding the pressurized gas to pass the liquid through the gas filter.

4. The method according to claim 3 wherein expanding the pressurized gas includes opening a drain port in the holding vessel to rapidly expand the pressurized gas.

5. The method according to claim 3 wherein the pressurized gas pressure is from about 20 psig to about 150 psig.

6. The method according to claim 3 wherein the pressurized gas pressure is from about 80 psig to about 100 psig.

7. The method according to claim 3 comprising supplying the pressurized gas from a gas reservoir.

8. The method according to claim 3 comprising prefiltering the pressurized gas to at least the rating of the gas filter in gas service.

9. The method according to claim 3 wherein the pressurized gas is air.

10. The method according to claim 1 comprising prefiltering the liquid to at least the rating of the gas filter in liquid service.

11. The method according to claim 1 wherein the gas filter is at least HEPA rated.

12. The method according to claim 1 wherein the gas filter is a metal filter.

13. The method according to claim 12 wherein the metal filter is at least HEPA rated.

14. The method according to claim 1 wherein the liquid is water.

15. The method according to claim 14 wherein the water includes a surfactant.

16. The method according to claim 1 wherein the influent gas stream comprises particulates and the method further comprises filling the holding vessel with liquid so that the liquid reduces the attractive forces between the gas filter and the particulates or between the particulates.

17. The method according to claim 1 wherein the influent gas stream comprises particulates which are trapped by the gas filter and the method further comprises filling the holding vessel with liquid so that the liquid partially solubilizes the particulates trapped by the gas filter.

18. The method according to claim 1 comprising draining the backwash liquid into a backwash tank for waste disposal.

19. The method according to claim 1 wherein the influent gas stream comprises particulates which are trapped by the gas filter and the method further comprises filling the holding vessel with liquid so that the liquid substantially saturates the gas filter for dislodging the particulates trapped by the gas filter.

20. A filtration system for cleaning a filter element used in clarifying a gas stream, the filtration system comprising:

a holding vessel containing a filter element for clarifying a gas stream, an outlet port, and an inlet port for receiving the gas stream so that the gas stream flows in one direction through the filter element and the outlet port;

a source of backwash liquid in communication with the holding vessel; and a source of pressurized gas for pressurizing the holding vessel and for forcing the liquid in the opposite direction of the gas stream through the filter element to clean the filter element.

21. The system according to claim 20 comprising a prefilter for prefiltering the gas to at least the rating of the filter element in gas service.

22. The system according to claim 21 wherein the liquid is water.

23. The system according to claim 22 wherein the water includes a surfactant.

24. The system according to claim 20 wherein the gas pressure of the pressurized gas is from about 20 psig to about 150 psig.

25. The system according to claim 20 wherein the gas pressure of the pressurized gas is from about 80 psig to about 100 psig.

26. The system according to claim 20 wherein the filter element has a rating in liquid service and the system further comprises a prefilter for prefiltering the backwash liquid to at least the rating of the filter element in liquid service.

27. The system according to claim 20 wherein the gas stream comprises particulates and the liquid reduces the attractive forces between the filter element and the particulates or between the particulates.

28. The system according to claim 20 wherein the gas stream comprises particulates which are trapped by the filter element and the liquid partially solubilizes the particulates trapped by the filter element.

29. The system according to claim 20 comprises a backwash tank for accepting the backwash liquid for waste disposal.

30. The system according to claim 20 wherein the gas stream comprises particulates which are trapped by the filter element and the liquid source substantially saturates the filter element for dislodging the particulates trapped by the filter element.

31. The system according to claim 20 wherein the inlet and outlet ports are closed for permitting the holding vessel to be filled with liquid and pressurized with gas and rapidly opened for expanding the pressurized gas and creating a high liquid flow in the opposite direction of the gas stream for cleaning the filter element.

32. A filter system for use in clarifying gas streams in radioactive waste processing plants comprising a holding vessel containing a filter element for clarifying gas streams containing radioactive particulates, an outlet port and an inlet port for receiving the gas stream so that the gas stream flows in one direction through the filter element and the outlet port; and a source of backwash liquid in communication with the holding vessel for passing the liquid in the opposite direction of the gas stream through the filter element to clean the filter element.

33. A filter system according to claim 32 comprising a source of pressurized gas for pressurizing the holding vessel and forcing the liquid to flow in the opposite direction of the gas stream.

* * * * *

UNITED STATES PATENT AND TRADEMARK OFFICE
CERTIFICATE OF CORRECTION

PATENT NO. : 5,358,552
DATED : OCTOBER 25, 1994
INVENTOR(S) : JEFFREY M. SEIBERT, NELSON SOBEL AND LAWRENCE D. WEBER

It is certified that error appears in the above-indentified patent and that said Letters Patent is hereby corrected as shown below:

ON THE TITLE PAGE:

[75] Inventors: third inventor "Lawrence P. Weber" should read

-- Lawrence D. Weber --.

[56] References Cited

OTHER PUBLICATIONS

Second column, line 3, "Ball" should read -- Pall --.

Signed and Sealed this

Eighth Day of August, 1995

Attest:

BRUCE LEHMAN

*Attesting Officer*  *Commissioner of Patents and Trademarks*